(12) United States Patent
Thorne

(10) Patent No.: US 11,269,099 B2
(45) Date of Patent: Mar. 8, 2022

(54) SYSTEMS AND METHODS FOR GENERATING FACIES REALIZATIONS

(71) Applicant: CHEVRON U.S.A. INC., San Ramon, CA (US)

(72) Inventor: Julian A. Thorne, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 234 days.

(21) Appl. No.: 16/551,219

(22) Filed: Aug. 26, 2019

(65) Prior Publication Data

US 2021/0063592 A1  Mar. 4, 2021

(51) Int. Cl.
*G01V 1/30* (2006.01)
*G01V 1/28* (2006.01)
*G01V 1/34* (2006.01)

(52) U.S. Cl.
CPC .............. *G01V 1/301* (2013.01); *G01V 1/282* (2013.01); *G01V 1/345* (2013.01)

(58) Field of Classification Search
CPC ......... G01V 1/301; G01V 1/282; G01V 1/345
See application file for complete search history.

(56) References Cited

U.S. PATENT DOCUMENTS

| 7,079,953 | B2 | 7/2006 | Thorne et al. |
| 8,666,149 | B2 | 3/2014 | Thorne |
| 9,274,249 | B2 | 3/2016 | Thorne |
| 2011/0231164 | A1* | 9/2011 | Zhang .................. G01V 99/005 703/2 |
| 2014/0037197 | A1* | 2/2014 | Thorne ................ G06K 9/6255 382/159 |
| 2015/0285950 | A1 | 10/2015 | Yarus et al. |
| 2016/0103245 | A1* | 4/2016 | Pyrcz ..................... G01V 11/00 703/2 |
| 2018/0003839 | A1 | 1/2018 | Lowell et al. |
| 2019/0041534 | A1 | 2/2019 | Bandura et al. |

OTHER PUBLICATIONS

International Search Report and Written Opinion dated Nov. 13, 2020 for International Application No. PCT/US2020/047026, filed Aug. 19, 2020.

* cited by examiner

*Primary Examiner* — Bryan Bui
(74) *Attorney, Agent, or Firm* — Sheppard, Mullin, Richter & Hampton LLP

(57) ABSTRACT

Systems and methods are disclosed for generating a set of facies realizations. A computer-implemented method may use a computer system that includes a physical computer processor and data storage. The computer-implemented method may include: obtaining a geobody index, obtaining facies probability vectors for the multiple geobodies, assigning facies to the multiple geobodies based on the facies probability vectors, obtaining a target facies proportion for the subsurface volume of interest, reassigning a first geobody having a first facies based on a first facies probability vector of the first geobody, and reassigning remaining ones of the multiple geobodies with different facies.

19 Claims, 8 Drawing Sheets

SYSTEMS AND METHODS FOR GENERATING FACIES REALIZATIONS

FIELD OF THE DISCLOSURE

The present disclosure relates to systems and methods for generating facies realizations.

BACKGROUND

In order to make realistic models to inform reservoir management decisions, such as infill and injector locations, the right-sizing of facilities, and other decisions, seismic data should be integrated into earth models of facies at the reservoir scale. Existing technologies may calibrate seismic attributes to well control using facies probability cubes. However, these facies probability cubes are often fuzzy with probabilities that are not near 0 or 1 because the seismic property distributions of one facies overlap with each other. As a result, geostatistical realizations may be highly variable from one realization to the next and provide poor representations of the actual subsurface volume of interest.

SUMMARY

Embodiments of the disclosure are directed to systems and methods for generating a set of facies realizations. The system may include a physical computer processor and data storage. In one embodiment, a computer-implemented method may include obtaining a geobody index. The geobody index may identify multiple geobodies as a function of position in a subsurface volume of interest. The computer-implemented method may also include obtaining facies probability vectors for the multiple geobodies. The computer-implemented method may further include assigning facies to the multiple geobodies based on the facies probability vectors. The computer-implemented method may also include obtaining a target facies proportion for the subsurface volume of interest. The target facies proportion may specify a ratio of multiple facies in the subsurface volume of interest. The computer-implemented method may further include reassigning a first geobody having a first facies based on a first facies probability vector of the first geobody. The reassignment may be based on a first proportion of the first facies in the subsurface volume of interest being outside a threshold range of the target facies proportion for the first facies. The computer-implemented method may further include reassigning remaining ones of the multiple geobodies with different facies. The reassignment may be based on corresponding ones of the facies probability vectors until proportions of the multiple facies in the subsurface volume of interest match the target facies proportion within the threshold range.

In embodiments, the computer-implemented method may further include modeling one or more large geobodies in the subsurface volume of interest using a geobody model. The large geobodies may be bigger than a geobody threshold.

In embodiments, the computer system may further include a display. The computer-implemented method may include generating a representation of a facies realization in the subsurface volume of interest using visual effects to depict at least one of the multiple geobodies or at least one of the one or more large geobodies and corresponding facies. The computer-implemented method may also include displaying the representation.

In embodiments, the first proportion of the first facies may be assigned first because it is a proportion that is furthest from a corresponding threshold range.

In embodiments, the geobody index may be generated based on subsurface data from the subsurface volume of interest.

In embodiments, the facies probability vector may be generated by obtaining facies probability volumes as a function of position in the subsurface volume of interest. The facies probability vector may also be generated by generating facies probability vectors for the multiple geobodies based on averages of facies probability volumes corresponding to the multiple geobodies.

In another embodiment, the computer-implemented method may include a physical computer processor and data storage. The computer-implemented method may further include obtaining a geobody index as a function of position in a subsurface volume of interest. The geobody index may identify multiple geobodies in the subsurface volume of interest. A given geobody may include one or more facies. The computer-implemented method may also include obtaining a target facies proportion for the subsurface volume of interest. The target facies proportion may identify a ratio of multiple facies in the subsurface volume of interest. The computer-implemented method may further include obtaining facies probability vectors for the multiple geobodies. The computer-implemented method may also include ordering the multiple geobodies into a facies order based on the target facies proportion and the facies probability vectors. The computer-implemented method may further include assigning at least some of the multiple geobodies to the first facies based on the facies order until the first facies is within a facies threshold range of the target facies proportion. The computer-implemented method may further include assigning remaining ones of the multiple geobodies to remaining facies until the target facies proportions is met within the facies threshold range.

In embodiments, the computer-implemented method may further include modeling one or more large geobodies in the subsurface volume of interest using a geobody model. The large geobodies may be bigger than a geobody threshold.

In embodiments, the computer system may include a display. The computer-implemented method may include generating a representation of a facies realization in the subsurface volume of interest using visual effects to depict at least one of the multiple geobodies or at least one of the one or more large geobodies and corresponding facies. The computer-implemented method may also include displaying the representation.

In embodiments, the facies order may order the one or more facies to be assigned to the multiple geobodies from a smallest facies proportion of the target facies proportion to a largest facies proportion of the target facies proportion.

In embodiments, the geobody index may be generated based on subsurface data from the subsurface volume of interest.

In embodiments, the facies probability vector may be generated by obtaining facies probability volumes as a function of position in the subsurface volume of interest. The facies probability vector may also be generated by generating facies probability vectors for the multiple geobodies based on averages of realizations of facies probability volumes. A given facies probability vector may correspond to a given geobody.

In another embodiment, a system configured for generating facies realizations as a function of position in a subsurface volume of interest is disclosed. The system may include data storage. The system may also include a physical computer processor configured by machine-readable instructions to perform a number of operations. One operation may include obtaining a geobody index as a function of position in a subsurface volume of interest. The geobody index may identify multiple geobodies. A given geobody may include one or more facies. Another operation may include obtaining a target facies proportion for the subsurface volume of interest. The target facies proportion may identify a ratio of multiple facies in the subsurface volume of interest. Yet another operation may include generating facies probability vectors for the multiple geobodies.

In embodiments, the physical computer processor may be further configured by the machine-readable instructions to perform a number of operations. One operation may include assigning facies to the multiple geobodies based on the facies probability vectors. Another operation may include reassigning a first geobody having a first facies to a second facies based on a first facies probability vector of the first geobody. This reassignment may be based on a first proportion of the first facies in the subsurface volume of interest that is outside a threshold range of the target facies proportion for the first facies. Yet another operation may include reassigning remaining ones of the multiple geobodies with different facies based on corresponding ones of the facies probability vectors until proportions of the multiple facies in the subsurface volume of interest match the target facies proportion within the threshold range.

In embodiments, the physical computer processor may be further configured by the machine-readable instructions to model one or more large geobodies in the subsurface volume of interest using a geobody model. The large geobodies may be bigger than a geobody threshold.

In embodiments, the computer system may further include a display. The physical computer processor may be configured by the machine-readable instructions to generate a representation of a facies realization in the subsurface volume of interest using visual effects to depict at least one of the multiple geobodies or at least one of the one or more large geobodies and corresponding facies. The physical computer processor may also be configured by the machine-readable instructions to display the representation.

In embodiments, the physical computer processor may be further configured by the machine-readable instructions to perform a number of operations. One operation may include ordering the multiple geobodies into a facies order based on a probability of individual geobodies including the first facies. The first geobody may most likely have the first facies. Another operation may include assigning at least some of the multiple geobodies to the first facies based on the facies order until the first facies for the subsurface volume of interest is within a facies threshold range of the facies target proportion. Yet another operation may include assigning remaining ones of the multiple geobodies to remaining facies until the target facies proportions is met within the facies threshold range.

In embodiments, the physical computer processor may be further configured by the machine-readable instructions to model one or more large geobodies in the subsurface volume of interest using a geobody model. The large geobodies may be bigger than a geobody threshold.

In embodiments, the computer system further includes a display. The physical computer processor may be configured by the machine-readable instructions to generate a representation of a facies realization in the subsurface volume of interest using visual effects to depict at least one of the multiple geobodies or at least one of the one or more large geobodies and corresponding facies. The physical computer processor may also be configured by the machine-readable instructions to display the representation.

In embodiments, the facies order may order the one or more facies to be assigned to the multiple geobodies from a smallest facies proportion of the target facies proportion to a largest facies proportion of the target facies proportion.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as limiting. As used in the specification and in the claims, the singular form of "a", "an", and "the" include plural referents unless the context clearly dictates otherwise. The use of "angle" or "angles" is to be synonymous with "offset," unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Figure 1:
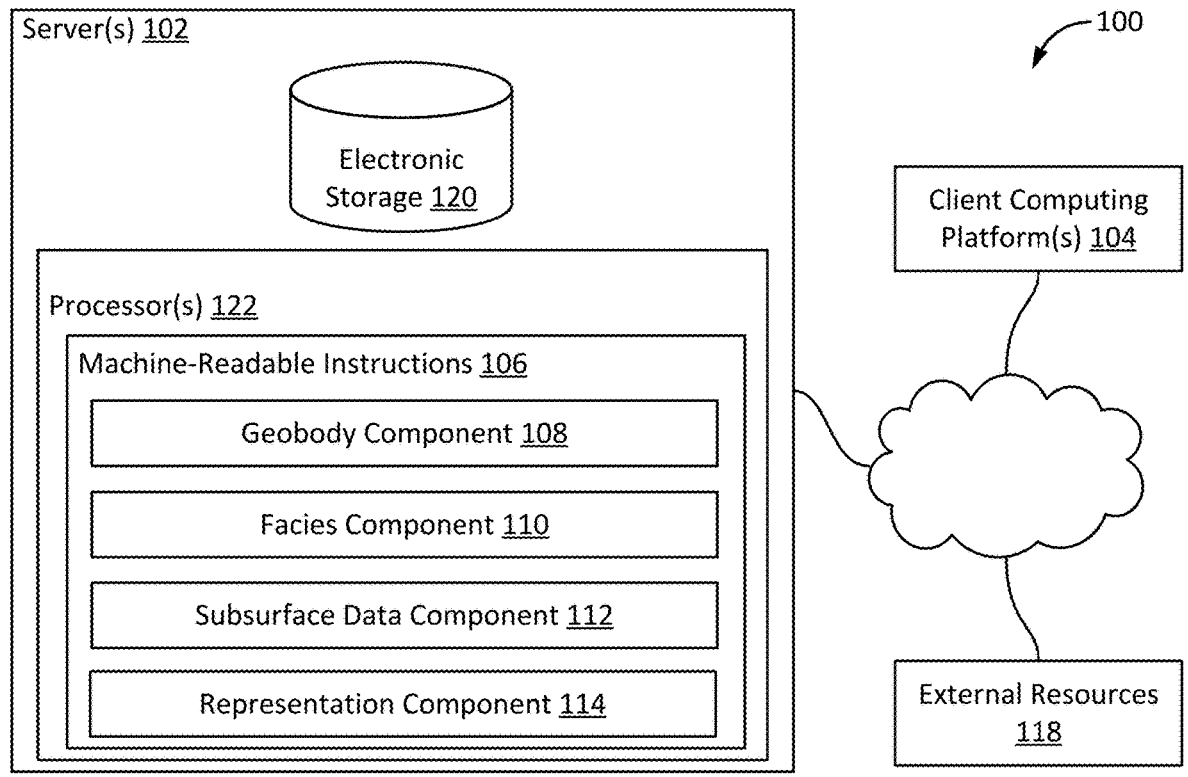
FIG. 1 illustrates a system for generating facies realizations, in accordance with one or more implementations.

Disclosed are systems and methods for generating facies realizations. The presently disclosed technology discloses systems and methods to integrate seismic data to generate meaningful facies realizations that preserve patterns in seismic data, while at the same time, preserves the variability on a node by node basis across multiple realizations prescribed by the facies probability volume. In implementations, alternative facies realizations can be built from different scenarios of target facies proportions to depict a maximum likelihood facies assignment process. In some implementations, a geobody index identifying geobodies in a subsurface volume of interest may be used to generate average facies probability vectors corresponding to the identified geobodies. The identified geobodies may be assigned facies based on sampling the facies probability vector of a corresponding geobody. In implementations, a target facies proportions identifying the proportions of facies in the subsurface volume of interest may be used to assign facies to the multiple geobodies. For example, the target facies proportions may indicate fifty percent for a first facies, thirty percent for a second facies, and twenty percent for a third facies. In one example, a first geobody assigned to a first facies may be selected. If the first facies in the subsurface volume of interest is above the target first facies proportion, the first geobody may be reassigned a facies based on a facies probability vector corresponding to the first geobody. The facies proportion for the subsurface volume of interest may be updated based on reassigning the first geobody from a first facies to a second facies. This process may be repeated until the facies of the geobodies closely match the target facies proportion (e.g., within about one percent, about five percent, and about ten percent of the facies proportion value).

In other implementations, the facies specified by the target facies proportion may be sorted from a lowest facies proportion value to a highest facies proportion value (e.g., the third facies has the lowest facies proportion which may be about twenty percent, the second facies is the second lowest facies proportion which may be about thirty percent, and a first facies is the highest facies proportion which may be fifty percent). As described above, a facies probability vector may be obtained for each geobody. To the extent any geobodies are assigned a facies, all the geobodies may be unassigned facies and/or otherwise initialized. The geobodies with unassigned facies may be ordered based on their facies probability vector such that the geobodies that are most likely to correspond to the third facies, having the smallest facies proportion, are first and the geobodies that are the second most likely to correspond to the third facies are second, and so on. Once the geobodies with unassigned facies are ordered, the first geobody may be assigned to the third facies, the second geobody may be assigned to the third facies, and so on until the target facies proportion for the third facies is met (e.g., about twenty percent of the geobodies may be assigned to the third facies). This process of ordering geobodies with unassigned facies may be repeated until all the geobodies are assigned a facies (e.g., about fifty percent for the first facies, about thirty percent for the second facies, and about twenty percent for the third facies).

In implementations, larger geobodies may be separately modeled or assigned facies. A representation of a facies realization may be generated based on one or more of the techniques described above. The representation may be displayed on a graphical user interface.

FIG. 1 illustrates a system 100 for generating facies realizations, in accordance with one or more implementations. In some implementations, system 100 may include one or more servers 102. Server(s) 102 may communicate with one or more client computing platforms 104 according to a client/server architecture and/or other architectures. Client computing platform(s) 104 may communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a geobody component 108, a facies component 110, a subsurface data component 112, a representation component 114, and/or other instruction components.

Geobody component 108 may obtain a geobody index as a function of position in a subsurface volume of interest. The geobody index may characterize one or more geobodies as a function of position in the subsurface volume of interest. The "subsurface volume of interest" refers to practically anything under a surface. For example, the subsurface volume of interest may be practically anything under a terrestrial surface (e.g., practically anything under a land surface), practically anything under a seafloor, etc. The subsurface volume of interest may be onshore in some implementations. Alternatively, the subsurface volume of interest may be offshore, with shallow water or deep water above the subsurface volume of interest, in some implementations. The subsurface volume of interest may include faults, fractures, overburdens, underburdens, salts, salt welds, rocks, sands, sediments, pore space, etc. The subsurface volume of interest may include practically any geologic point(s) or volume(s) of interest (such as, for example, a survey area). In implementations, the subsurface volume of interest may include geobodies. In some implementations, the subsurface volume of interest may include large geobodies that are outside a geobody threshold range. For example, the geobody threshold range may be user selected, but may range from the largest geobody size to about the 90 percentile geobody size.

A geobody may be clusters of geological elements in a contiguous volume. The contiguous volume may be based on one or more features. An example of such clustering and the one or more features is described in greater detail in US Patent Publication No. 2019-0179046, which is incorporated by reference herein in its entirety. In implementations, individual geobodies may be tagged with a unique ID to distinguish themselves from other geobodies in the subsurface volume of interest. In some implementations, the geobody index may be generated based on subsurface data. The subsurface data may include a seismic volume. The geobody index may be assigned such that each index represents a contiguous set of neighboring cells that are statistically similar in feature space.

Geobody component 108 may generate a geobody index based on a facies proportion volume as a function of position in the subsurface volume of interest. The facies proportion volume may characterize a probability of a facies as a function of position in the subsurface volume of interest. A facies may be the characteristics of a subsurface unit. This may include information corresponding to its origin and information differentiating the subsurface unit from others around it. For example, the characteristics may include mineralogy, sedimentary source, fossil content, sedimentary structure, texture, grain size, color, subsurface data, chemical, etc. Facies may include petrofacies, lithofacies, biofacies, ichnofacies, hydrofacies, and/or other facies.

Geobody component 108 may obtain multiple geobody slices. The multiple geobody slices may be merged to form a coherent geobody. A geobody slice may be a two-dimensional representation of at least part of a geobody. Similarities between geobody slices may be identified to merge the geobody slices. The second geobody slice may include one or more similarities with the first geobody slice. For example, the first geobody slice and the second geobody slice may both cover a first geobody. The outline of the geobody may be a similarity between the two geobody slices. The geobodies slices may be merged based on the similarities. The remaining ones of the multiple geobody slices may be merged, as described above. Merging the geobody slice to form coherent geobodies may generate the geobody index.

Geobody component 108 may model one or more large geobodies in the subsurface volume of interest based on a geobody model. The geobody model may be based on variograms, multi-point statistics (MPS)-based geostatistics, and/or other models.

Facies component 110 may obtain facies probability vectors for the individual ones of the multiple geobodies. The facies probability vector may characterize a probability of a corresponding geobody having one or more facies as a function of position in the corresponding geobody. The facies probability vector may be based on the facies proportion volume and the volume of the corresponding geobody. In implementations, the facies probability vector may be an average of the facies proportion volume over the volume of the corresponding geobody. In some implementations, it may be a median, a mode, and/or other analysis of the facies probability volume limited to the corresponding geobody. In some implementations, the facies probability vector may include the same values as the facies probability volume for the corresponding geobody, which may provide higher accuracy.

Facies component 110 may assign facies to the multiple geobodies based on the facies probability vector. In implementations, individual facies may be assigned to corresponding geobodies based on randomly sampling from the facies probability vector.

In one example, a first geobody in the subsurface volume of interest may have a facies probability vector including a fifty percent chance of a first facies, a thirty percent with a second facies, and a twenty percent with a third facies; a second geobody in the subsurface volume of interest may have a facies probability vector including a ten percent chance of the first facies, a seventy percent with the second facies, and a twenty percent with the third facies; the third geobody in the subsurface volume of interest may have a facies probability vector including a thirty percent chance of the first facies, a forty percent with the second facies, and a thirty percent with the third facies; and a fourth geobody in the subsurface volume of interest may have a facies probability vector including a twenty percent chance of the first facies, a twenty percent with the second facies, a twenty percent with the third facies, and a twenty percent chance with a fourth facies. Randomly sampling the facies probability vector, the first geobody may be assigned to the first facies (most likely facies), the second geobody may be assigned to the second facies (most likely facies), the third geobody may be assigned to the second facies (most likely facies), and the fourth geobody may be assigned to a first facies (most likely facies). This random assignment of the geobodies to facies may be used to generate a facies realization, as will be described in greater detail below. In implementations, multiple facies realizations may be generated. For example, with ten facies realizations, the first geobody may be assigned to the first facies in five of the facies realizations, the first geobody may be assigned to the second facies in three of the facies realizations, and the first geobody may be assigned to the third facies in two of the facies realizations, which corresponds to the facies probability vector of the first geobody. It should be appreciated that the other geobodies would also have a similar distribution over the ten facies realizations (e.g., the second geobody may be assigned to the first facies in one of the facies realizations; the second geobody may be assigned to the second facies in seven of the facies realizations; and the second geobody may be assigned to the third facies in two of the facies realizations; and so on for the other geobodies).

Facies component 110 may obtain a target facies proportion for the subsurface volume of interest. The target facies proportion may include a ratio of multiple facies for the subsurface volume of interest. In some implementations, the target facies proportion may be user selected. For example, the target facies proportion may specify forty percent of the subsurface volume of interest should be the first facies, thirty percent of the subsurface volume of interest should be the second facies, twenty percent should be the third facies, and ten percent should be the fourth facies.

Facies component 110 may reassign a facies assigned to the first geobody. In implementations, the facies initially assigned to the first geobody may be replaced based on a first facies proportion of a first facies realization. For example, the facies proportion corresponding to the first facies may be outside a threshold range of the first facies proportion of the target facies proportion. Similar to the example above, the target facies proportion may specify forty percent of the subsurface volume of interest should be the first facies. The subsurface volume of interest may include five geobodies. The first facies proportion, corresponding to the proportion of geobodies assigned to the first facies, of the first facies realization may be sixty percent (e.g., three geobodies may be assigned to the first facies). Since sixty percent is greater than forty percent, the threshold value (e.g., sixty percent) for the first facies is exceeded, and the geobodies with the first facies may be selected.

In implementations, a first geobody may be selected of the geobodies with the first facies. The first geobody may be selected based on a user selection, an initial assignment order by which the geobody was assigned to the first facies, the corresponding facies probability vector, geobody ID, etc. The assigning of facies process, described above, may be repeated again. Randomly sampling the facies probability vector may assign a second facies to the first geobody. The facies proportion of the new facies realization may be adjusted to account for this reassignment. In this example, the adjusted facies proportion of the new facies realization for the first facies may be forty percent in the subsurface volume of interest, which is at the threshold value of the target facies proportion, and the reassignment process can stop with respect to the first geobody. While this example relates to exceeding a threshold value, it should be appreciated that the same discussion could cover going below a threshold value, or otherwise being outside a threshold range.

Alternatively, the randomly sampled facies probability vector may assign the first facies again to the first geobody. In this example, the replacement process, described above, may be applied to the second geobody assigned to the first facies. The second geobody may be reassigned to a second facies or a third facies, and the replacements can stop with the second geobody. Alternatively, the second geobody may be reassigned to the first facies again and the reassignment process may continue onto the third and final geobody with the first facies. In implementations, the three geobodies may be reassigned the same facies based on the random sampling used for every assignment and reassignment; the reassignment may continue until the facies probability volume is at, or under, the threshold value. In some implementations, random sampling may be limited to the other facies that are not being reassigned. Continuing the example above, the facies probability vector corresponding to the first geobody may be randomly sampled between the second facies and the third facies. In order to prevent bias, the process to select a geobody to be reassigned may be randomized. It should be appreciated that other techniques may be used to reassign the first facies of a first geobody with another facies.

Facies component 110 may reassign the multiple facies to the remaining geobodies. As described above, multiple geobodies may be reassigned facies based on the facies probability vectors, the facies proportions of a facies realization, user input, an assignment order, and/or a geobody ID, among other factors. This may be continued until the target facies proportion is satisfied for each specified facies. It should be appreciated that the target facies proportion may identify one or some of the facies proportions. In some implementations, the target facies proportion may identify all the facies proportions in the subsurface volume of interest. For example, the target facies proportion may specify sixty percent of the subsurface volume of interest should be the first facies. In another example, the target facies proportion may specify sixty percent of the subsurface volume of interest should be the first facies and twenty percent of the subsurface volume of interest should be the second facies. The individual thresholds, sixty percent and twenty percent, may represent different limits (e.g., an upper limit and a lower limit, respectively). The first facies proportion for this facies realization may be eighty percent for the first facies and twenty percent for the third facies. The replacement process, described above, may occur and/or continue so the first facies proportion drops below sixty percent, and the replacement process may occur and/or continue so the second facie exceeds twenty percent, both based on the target facies proportion.

Facies component 110 may order multiple geobodies into a facies order. In some implementations, the facies order may be based on the target facies proportion. For example, the target facies proportion may specify fifty percent of the subsurface volume of interest should be the first facies, thirty percent of the subsurface volume of interest should be the second facies, and twenty percent of the subsurface volume of interest should be the third facies. In one example, the facies order based on the target facies proportion may be ordered from smallest facies proportion to the largest facies proportion of the target facies proportion (e.g., the third facies, the second facies, and the first facies). In another example, the facies order based on the target facies proportion may be from largest facies proportion to the smallest facies proportion of the target facies proportion (e.g., the first facies, the second facies, and the third facies). In some implementations, the facies order may be random.

In implementations, the facies order may be based on facies probability vectors. Continuing the example above, using the facies order of smallest facies proportion to the largest facies proportion, a first geobody, that has the highest probability of the third facies based on its facies probability vector, may be ordered first for the geobodies for the third facies; a second geobody, that has the second highest probability of the third facies, may be ordered second for the geobodies for the third facies, and so on. The facies order for the other facies may order the same geobodies identified in the facies order of the third facies. For example, the third geobody, that may have the highest probability of the second facies, may be ordered first for the geobodies of the second facies; a first geobody, that has the second highest probability of the third facies, may be ordered second for the geobodies for the second facies; and a second geobody, that has the third highest probability of the third facies, may be ordered third for the geobodies for the second facies. In implementations, the facies order may be stored.

Facies component 110 may assign a first geobody to a facies based on the facies order. Continuing the example above, the target facies proportion may specify forty percent of the subsurface volume of interest should be the first facies, forty percent of the subsurface volume of interest should be the second facies, and twenty percent of the subsurface volume of interest should be the third facies. The subsurface volume of interest may include five geobodies. The facies order may be from smallest target facies proportion to the largest facies proportion. The first geobody, that has the highest probability of the third facies, may be assigned to the third facies first. For the five geobody volume of interest, the twenty percent target facies proportion for the third facies is satisfied because the first geobody is assigned to the third facies.

Facies component 110 may assign the remaining ones of the multiple geobodies to the one or more facies until the target facies proportions are satisfied. Continuing where the last example left off, the first facies proportion and the second facies proportion are equal, and the next facies to be assigned may be random. In one example, the first facies could be assigned next. The fourth geobody, that has the highest probability for the first facies, may be assigned to the first facies first. The fourth geobody, that has the second highest probability for the first facies, may be assigned to the first facies second, thereby satisfying the first facies proportion requirements. The final two geobodies, the third geobody and the fifth geobody, would be assigned to the second facies.

Figure 2:
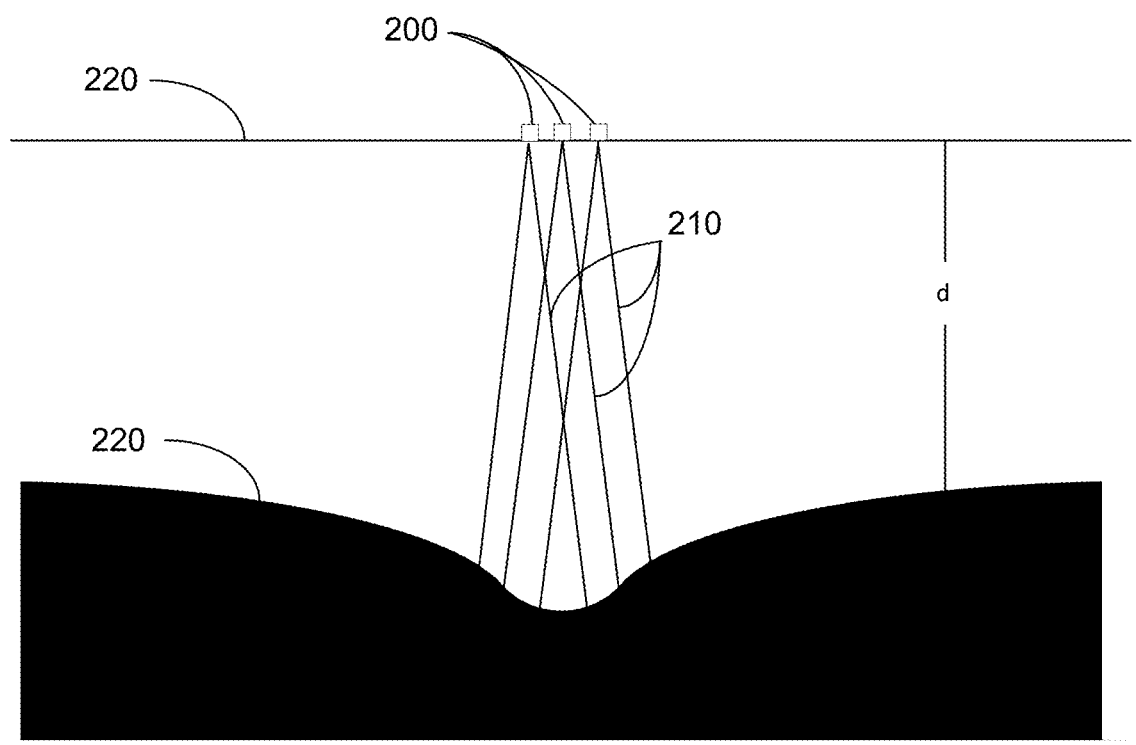
FIG. 2 illustrates an example layout to obtain subsurface data.

Subsurface data component 112 may obtain target subsurface data from a subsurface volume of interest. Subsurface data may include seismic data and/or well data. In some implementations, the subsurface data may be obtained using a set-up as illustrated in FIG. 2. FIG. 2 illustrates an example layout to obtain subsurface data. The subsurface data may be obtained by sending energy 210 into a subsurface volume of interest 220 using subsurface sources 200 and receiving the signal reflected off of a subsurface feature 220 at subsurface receivers 200. Zero-offset source-receiver pairs 200 may send energy waves 210 into subsurface volume 220. Energy waves 210 may reflect or refract off subsurface feature 220. Source-receiver pairs 200 may receive the reflected and refracted energy waves 210 which may be converted into subsurface amplitudes.

In some implementations, a subsurface source may send subsurface energy into the subsurface, which may then be reflected and/or refracted by subsurface features and may be recorded at subsurface receivers at various distances away from a subsurface source. Subsurface energy may include acoustic compression waves. For example, the subsurface source may generate acoustic compression waves and direct them towards a subsurface region that includes various lithologies (e.g., underground rock structures). The subsurface data may be generated from subsurface signals (e.g., the reflections of the subsurface energy off of the various subsurface lithologies) received by subsurface sensors, such as geophones and/or other acoustic detectors. The subsurface data may be stored.

Referring back to FIG. 1, representation component 114 may generate a representation of a facies realization in the subsurface volume of interest. The facies realization may include one or more geobodies assigned to corresponding facies. The representation may use visual effects to depict at least one of the multiple geobodies and corresponding facies. In some implementations, the representation may use visual effects to depict at least one of the multiple geobodies and at least one of the one or more large geobodies and corresponding facies for both. In some implementations, multiple representations may be presented in a single interface. For example, multiple facies realizations may be presented in a single interface. The individual facies in the facies realization may be identified using colors, patterns, and/or other visual effects.

Representation component 114 may display the representation. The representation may be displayed on a graphical user interface and/or other displays. The graphical user interface may include a user interface based on graphics instead of text; uses a mouse as well as a keyboard as an input device, according to some implementations. In implementations, a user may zoom in on and/or view one or more locations of the subsurface volume of interest to illustrate more detail on a given location.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors to execute computer program components. The computer program components may enable a user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may include non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of non-transient electronic storage, optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may provide information processing capabilities in server(s) 102. As such, processor(s) 122 may include one or more of a physical computer processor, a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may execute components 108, 110, 112, 114, and/or other components. Processor(s) 122 may execute components 108, 110, 112, 114, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and 114 are illustrated in FIG. 1 as being implemented within a single processing unit, in implementations in which processor(s) 122 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As an example, processor(s) 122 may execute one or more additional components that may perform some or all of the functionality attributed below to one of components 108, 110, 112, and/or 114.

Figure 3:
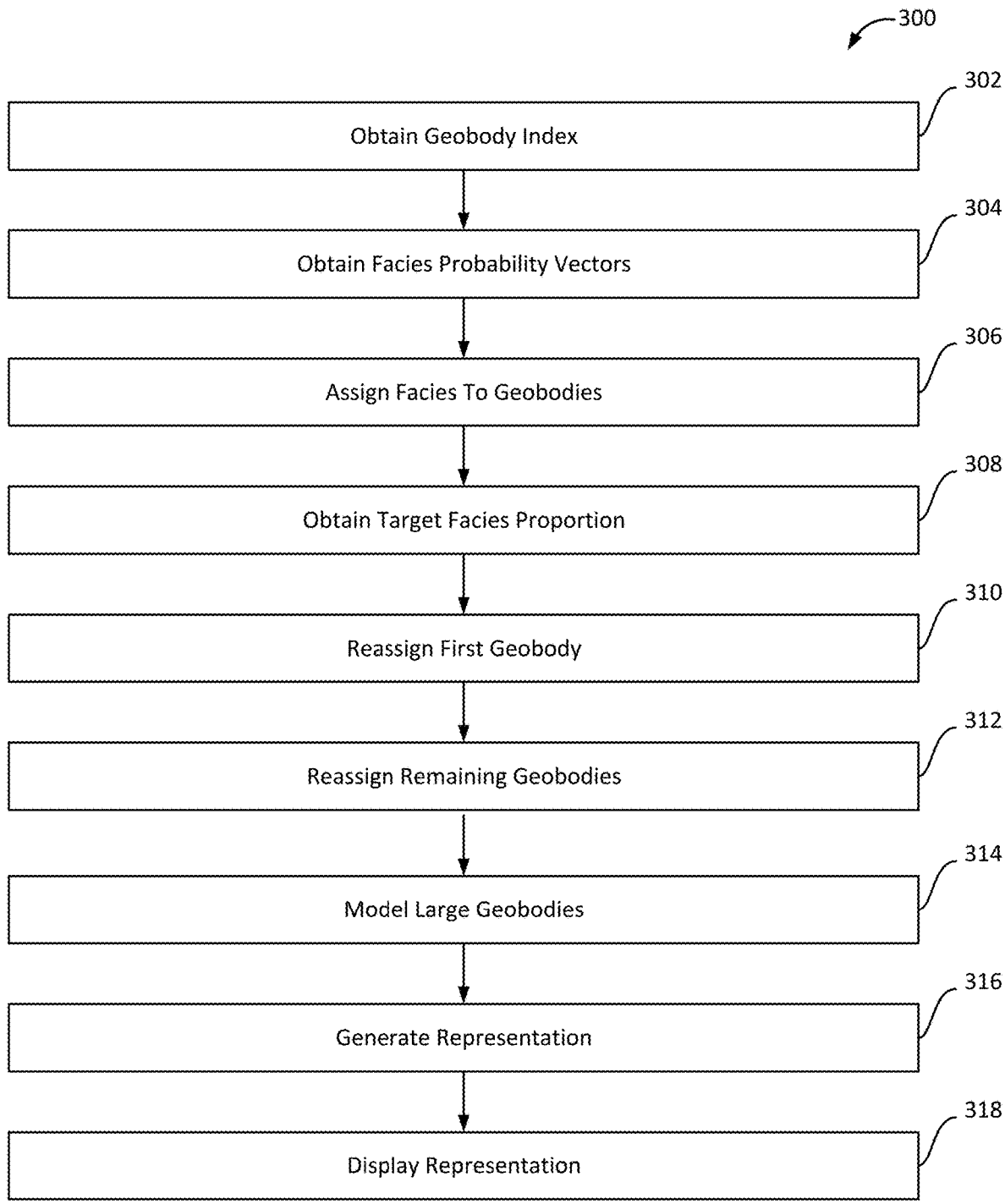
FIG. 3 illustrates a method for generating facies realizations, in accordance with one or more implementations.
Figure 4:
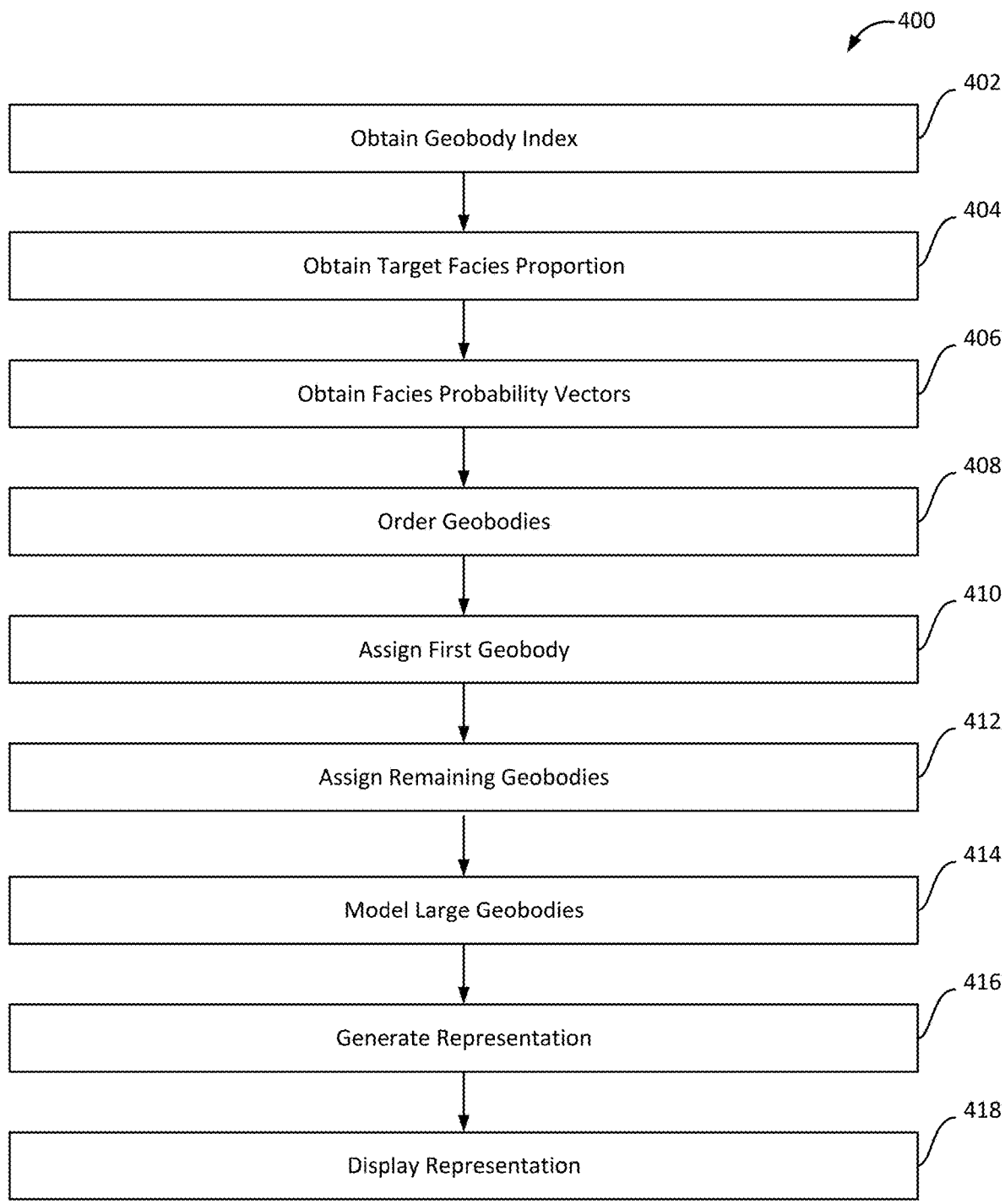
FIG. 4 illustrates a method for generating facies realizations, in accordance with one or more implementations.
Figure 5:
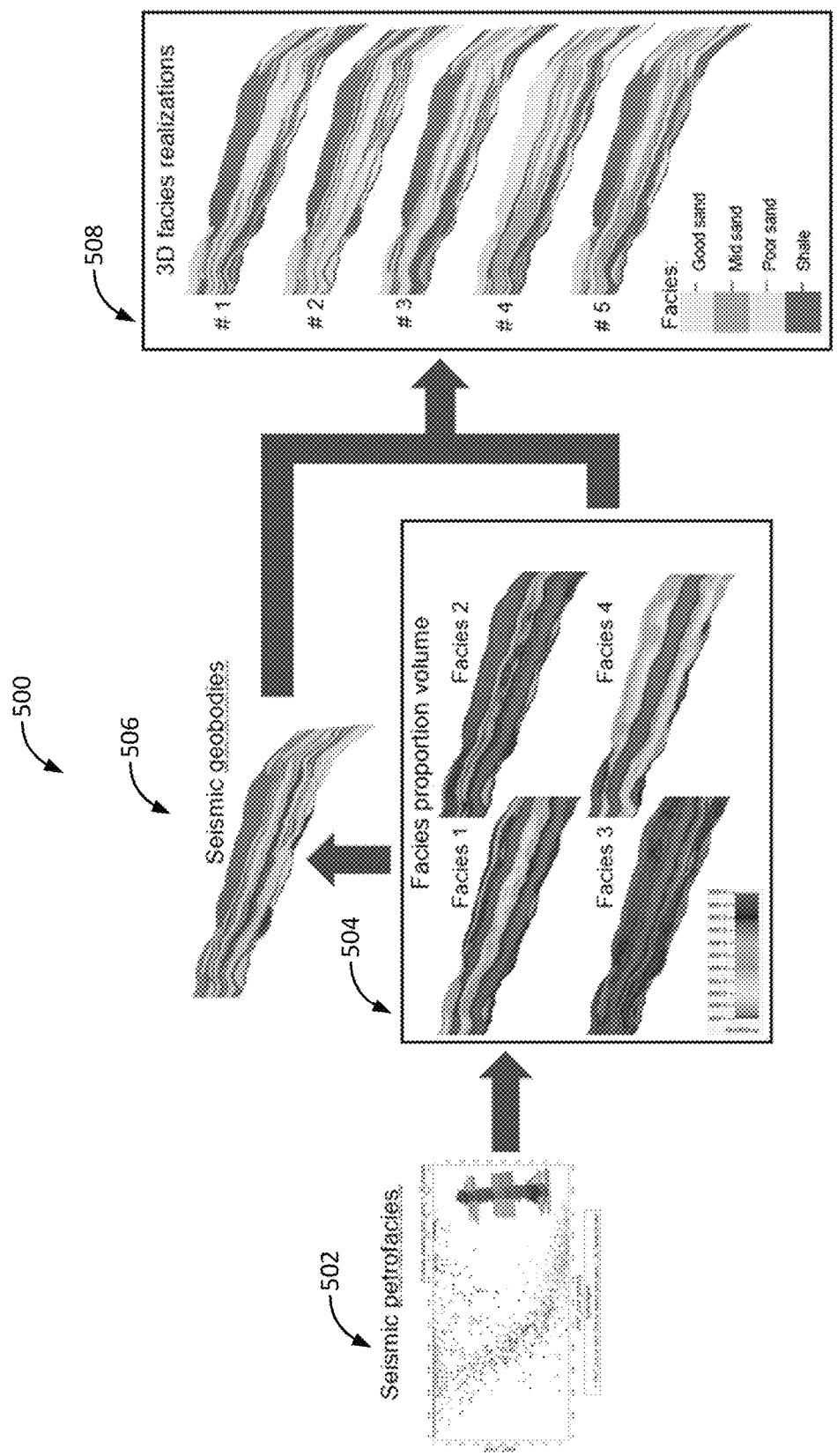
FIG. 5 illustrates an example workflow, in accordance with one or more implementations.

FIG. 3 illustrates a method 300 for generating facies realizations, in accordance with one or more implementations. The operations of methods 300, 400, and 500 presented below are intended to be illustrative. In some implementations, methods 300, 400, and 500 may be accomplished with one or more additional operations not described, and/or without one or more of the operations discussed. Additionally, the order in which the operations of methods 300, 400, and 500 are illustrated in FIGS. 3, 4, and 5 and described below is not intended to be limiting.

In some implementations, methods 300, 400, and 500 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of methods 300, 400, and 500 in response to instructions stored electronically on an electronic storage medium. The one or more processing devices may include one or more devices configured through hardware, firmware, and/or software to be specifically designed for execution of one or more of the operations of methods 300, 400, and 500.

302 may include obtaining a geobody index, as described above. The geobody index may include multiple geobodies as a function of position in the subsurface volume of interest. 302 may be performed by one or more physical computer processors configured by machine-readable instructions including a component that is the same as or similar to geobody component 108, in accordance with one or more implementations.

304 may include obtaining facies probability vectors, as described above. 304 may be performed by one or more physical computer processors configured by machine-readable instructions including a component that is the same as or similar to facies component 110, in accordance with one or more implementations.

306 may include assigning facies to the multiple geobodies. Assigning may be based on facies probability vectors. 306 may be performed by one or more physical computer processors configured by machine-readable instructions including a component that is the same as or similar to facies component 110, in accordance with one or more implementations.

308 may include obtaining a target facies proportion. The target facies proportion may include a ratio of multiple facies for the subsurface volume of interest. 308 may be performed by one or more physical computer processors configured by machine-readable instructions including a component that is the same as or similar to facies component 110, in accordance with one or more implementations.

310 may include reassigning a first geobody. The first geobody having a first facies may be reassigned based on a first facies proportion being outside a threshold range of the first facies of the target facies proportion. The first geobodies may be reassigned to another facies based on the facies probability vector for the first geobody. 310 may be performed by one or more physical computer processors configured by machine-readable instructions including a component that is the same as or similar to facies component 110, in accordance with one or more implementations.

312 may include reassigning remaining geobodies. 312 may repeat the process of 310 until the target facies proportions are satisfied. 312 may be performed by one or more physical computer processors configured by machine-readable instructions including a component that is the same as or similar to facies component 110, in accordance with one or more implementations.

314 may include modeling large geobodies. The modeling may be based on variograms, statistics, and/or other analysis, as described above. 314 may be performed by one or more physical computer processors configured by machine-readable instructions including a component that is the same as or similar to geobody component 108, in accordance with one or more implementations.

316 may include generating a representation. The representation may be of a facies realization of at least one of the multiple geobodies and corresponding facies. In some implementations, the representation may also include at least one of the large geobodies and corresponding facies. 316 may be performed by one or more physical computer processors configured by machine-readable instructions including a component that is the same as or similar to representation component 114, in accordance with one or more implementations.

318 may include displaying a representation. 318 may be performed by one or more physical computer processors configured by machine-readable instructions including a component that is the same as or similar to representation component 114, in accordance with one or more implementations.

FIG. 4 illustrates a method 400 for generating facies realizations, in accordance with one or more implementations. 402 may be substantially similar to 302.

404 may be substantially similar to 308.

406 may be substantially similar to 304.

408 may include ordering the multiple geobodies. The multiple geobodies may be ordered based on the facies order, as described above. 408 may be performed by one or more physical computer processors configured by machine-readable instructions including a component that is the same as or similar to facies component 110, in accordance with one or more implementations.

410 may include assigning a first geobody. The first geobody may be assigned based on the facies order. 410 may be performed by one or more physical computer processors configured by machine-readable instructions including a component that is the same as or similar to facies component 110, in accordance with one or more implementations.

412 may include assigning remaining geobodies. 410 may be repeated until all the geobodies are assigned to a corresponding facies. 412 may be performed by one or more physical computer processors configured by machine-readable instructions including a component that is the same as or similar to facies component 110, in accordance with one or more implementations.

414-418 may be substantially similar to 314-318.

FIG. 5 illustrates an example workflow, in accordance with one or more implementations. Workflow 500 includes obtaining subsurface data 502, as described above. 504 illustrates a facies proportion volume. As illustrated, the subsurface volume of interest may include four different facies. Each facies uses a color map to illustrate a probability of each facies as a function of position in the subsurface volume of interest. Using the subsurface data 502, the facies proportion volume 504 can be generated. 506 illustrates seismic geobodies in the subsurface volume of interest, as described above. As illustrated, it may be a three dimensional subsurface volume of interest with multiple geobodies. Each color may represent a different geobody.

Using the facies proportion volume 504, the seismic geobodies 506 can be generated, as described above. The facies proportion volume 504 and the seismic geobodies 506 can be used to generated facies realizations in 508, as described above. As illustrated, five example realizations may be generated. For example, facies realization #1 may illustrate more shale on the top and bottom of the facies realizations. Facies realization #2 may illustrate more poor sand toward the bottom of the facies realization and more distinct layers separating the good sand and the mid sand. Facies realization #3 may illustrate more shale in the top and the bottom left of the facies realization and a piece of mid sand enveloped by the good sand. Facies realization #4 may illustrate more good sand and mid sand than other facies realizations in the top and middle of the facies realization. Facies realization #5 may illustrate more shale on the top and bottom of the facies realization and a bigger portion of mid sand than good sand compared to facies realizations #1, #2, and #3.

Figure 6:
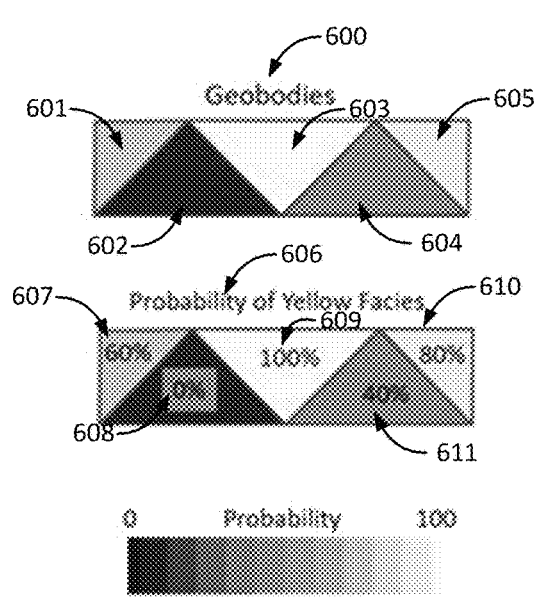
FIG. 6 illustrates example geobodies and examples facies realizations, in accordance with one or more implementations.
Figure 6:
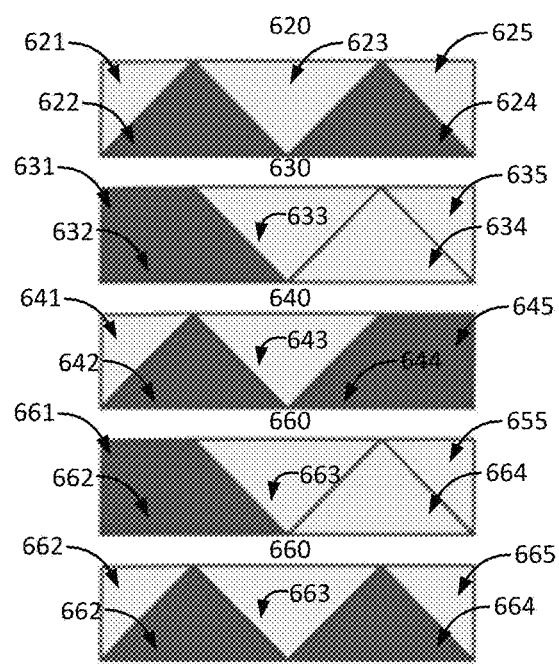

FIG. 6 illustrates example geobodies and examples facies realizations, in accordance with one or more implementations. 600 represents an example subsurface volume of interest with five different geobodies 601, 602, 603, 604, and 605. Yellow may represent a fictional facies to more easily represent the presently disclosed technology. The facies proportion, or probability of yellow facies as illustrated, indicates the likelihood of a yellow facies for each geobody. Facies proportion 607, which indicates a sixty percent chance of being characterized as a yellow facies, corresponds to geobody 601. Facies proportion 608, which indicates a zero percent chance of being characterized as a yellow facies, corresponds to geobody 602. Facies proportion 609, which indicates a hundred percent chance of being characterized as a yellow facies, corresponds to geobody 603. Facies proportion 610, which indicates a forty percent chance of being characterized as a yellow facies, corresponds to geobody 604. Facies proportion 611, which indicates an eighty percent chance of being characterized as a yellow facies, corresponds to geobody 604. The facies realizations 620, 630, 640, 660, and 660 correspond to the facies proportions 606. As illustrated, geobody 601 is characterized as having a yellow facies sixty percent of the time in the five realizations, or in three out of the five realizations (e.g., 621, 641, and 661). Geobody 602 is never characterized as having a yellow facies. Geobody 603 is characterized as having a yellow facies a hundred percent of the time in the five realizations, or in five out of the five realizations (e.g., 623, 633, 643, 653, and 663). Geobody 604 is characterized as having a yellow facies forty percent of the time in the five realizations, or in two out of the five realizations (e.g., 634 and 664). Geobody 605 is characterized as having a yellow facies eighty percent of the time in the five realizations, or in four out of the five realizations (e.g., 625, 635, 655, and 665). It should be appreciated that while the geobodies are somewhat rigidly defined in FIG. 6 (e.g., as triangles), the geobodies can have various shapes and sizes and may be clustered according to other features, as described in US Patent Publication No. 2019-0179046.

Figure 7:
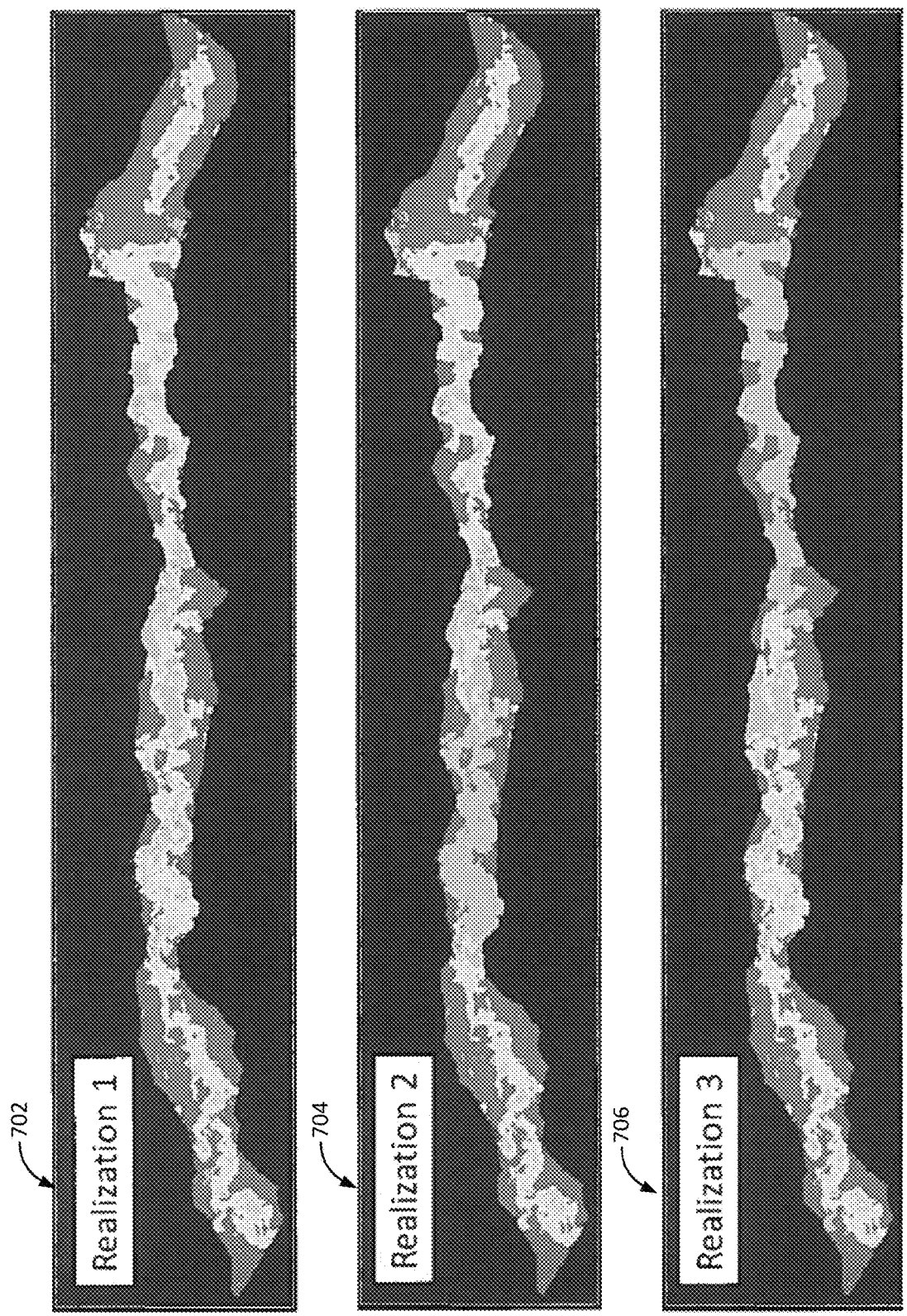
FIG. 7 illustrates example facies realizations, in accordance with one or more implementations.

FIG. 7 illustrates example facies realizations, in accordance with one or more implementations. Facies realization 702 illustrates that a first facies is more spread out through the subsurface volume of interest. Facies realization 704 illustrates that the first facies is more concentrated in the center of the subsurface volume of interest. Facies realization 706 illustrates that the first facies is more concentrated toward the center-right of the subsurface volume of interest.

Figure 8:
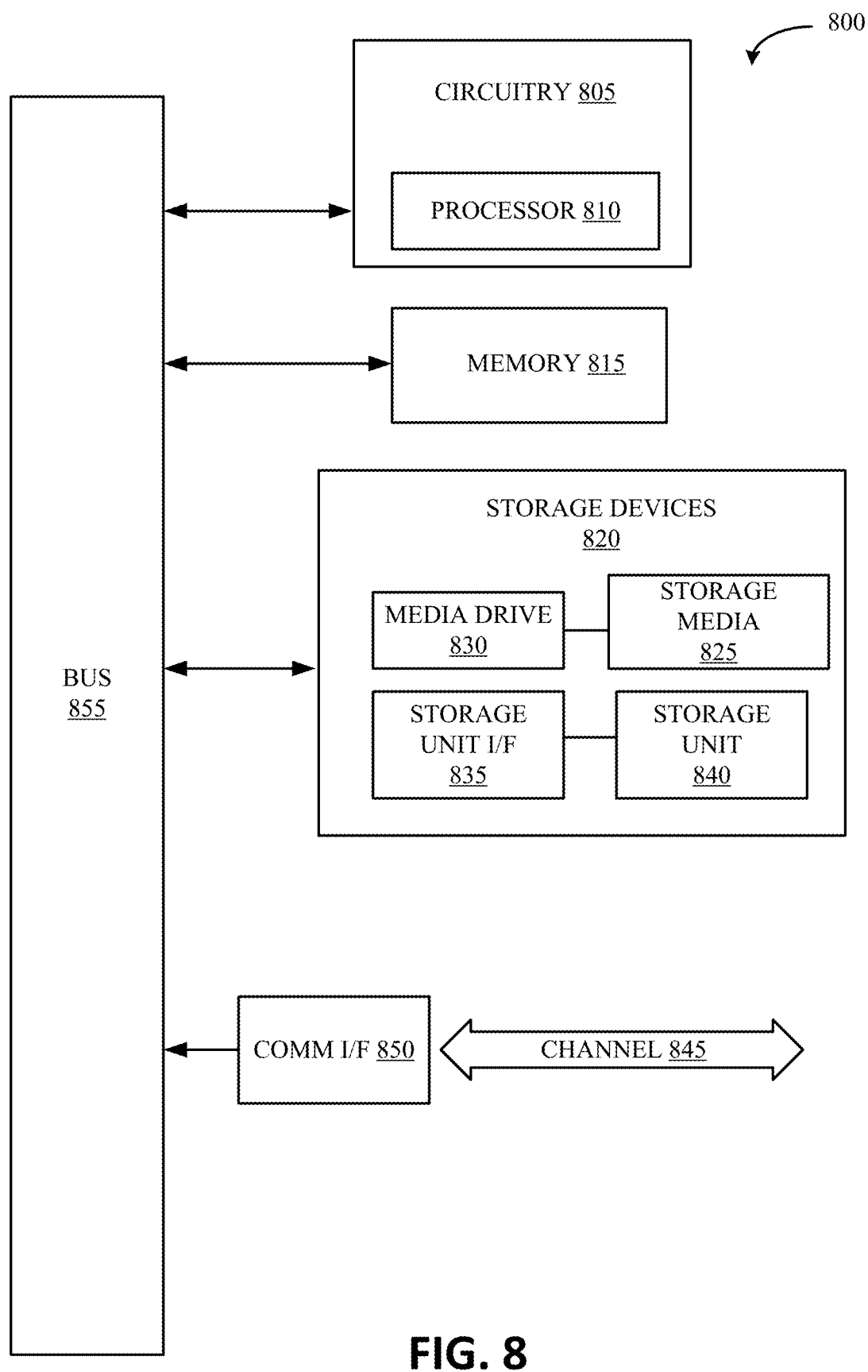
FIG. 8 is an example computing component that may be used to implement various features of implementations described in the present disclosure.

As used herein, the term component might describe a given unit of functionality that can be performed in accordance with one or more implementations of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one implementation, these software elements can be implemented to operate with a computing or processing component capable of carrying out the functionality described with respect thereto. One such example computing component is shown in FIG. 8. Various implementations are described in terms of this example-computing component 800. After reading this description, it will become apparent to a person skilled in the relevant art how to implement the technology using other computing components or architectures.

Referring now to FIG. 8, computing component 800 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 800 is specifically purposed.

Computing component 800 may include, for example, one or more processors, controllers, control components, or other processing devices, such as a processor 810, and such as may be included in circuitry 805. Processor 810 may be implemented using a special-purpose processing component such as, for example, a microprocessor, controller, or other control logic. In the illustrated example, processor 810 is connected to bus 855 by way of circuitry 805, although any communication medium may be used to facilitate interaction with other components of computing component 800 or to communicate externally.

Computing component 800 may also include one or more memory components, simply referred to herein as main memory 815. For example, random access memory (RAM) or other dynamic memory may be used for storing information and instructions to be executed by processor 810 or circuitry 805. Main memory 815 may also be used for storing temporary variables or other intermediate information during execution of instructions to be executed by processor 810 or circuitry 805. Computing component 800 may likewise include a read only memory (ROM) or other static storage device coupled to bus 855 for storing static information and instructions for processor 810 or circuitry 805.

Computing component 800 may also include one or more various forms of information storage devices 820, which may include, for example, media drive 830 and storage unit interface 835. Media drive 830 may include a drive or other mechanism to support fixed or removable storage media 825. For example, a hard disk drive, a floppy disk drive, a magnetic tape drive, an optical disk drive, a CD or DVD drive (R or RW), or other removable or fixed media drive may be provided. Accordingly, removable storage media 825 may include, for example, a hard disk, a floppy disk, magnetic tape, cartridge, optical disk, a CD or DVD, or other fixed or removable medium that is read by, written to, or accessed by media drive 830. As these examples illustrate, removable storage media 825 may include a computer usable storage medium having stored therein computer software or data.

In alternative implementations, information storage devices 820 may include other similar instrumentalities for allowing computer programs or other instructions or data to be loaded into computing component 800. Such instrumentalities may include, for example, fixed or removable storage unit 840 and storage unit interface 835. Examples of such removable storage units 840 and storage unit interfaces 835 may include a program cartridge and cartridge interface, a removable memory (for example, a flash memory or other removable memory component) and memory slot, a PCM-CIA slot and card, and other fixed or removable storage units 840 and storage unit interfaces 835 that allow software and data to be transferred from removable storage unit 840 to computing component 800.

Computing component 800 may also include a communications interface 850. Communications interface 850 may be used to allow software and data to be transferred between computing component 800 and external devices. Examples of communications interface 850 include a modem or soft-modem, a network interface (such as an Ethernet, network interface card, WiMedia, IEEE 802.XX, or other interface), a communications port (such as for example, a USB port, IR port, RS232 port Bluetooth® interface, or other port), or other communications interface. Software and data transferred via communications interface 850 may typically be carried on signals, which may be electronic, electromagnetic (which includes optical) or other signals capable of being exchanged by a given communications interface 850. These signals may be provided to/from communications interface 850 via channel 845. Channel 845 may carry signals and may be implemented using a wired or wireless communication medium. Some non-limiting examples of channel 845 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 815, storage unit interface 835, removable storage media 825, and channel 845. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 800 or a processor to perform features or functions of the present application as discussed herein.

While various implementations of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various implementations be implemented to perform the recited functionality in the same order unless the context dictates otherwise.

Although the disclosed technology is described above in terms of various exemplary implementations and implementations, it should be understood that the various features, aspects, and functionality described in one or more of the individual implementations are not limited in their applicability to the particular implementation with which they are described, but instead can be applied, alone or in various combinations, to one or more of the other implementations of the disclosed technology, whether or not such implementations are described and whether or not such features are presented as being a part of a described implementation. Thus, the breadth and scope of the technology disclosed herein should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various implementations set forth herein are described in terms of exemplary block diagrams, flow charts, and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

What is claimed is:

1. A computer-implemented method for generating a set of facies realizations implemented in a computer system that includes a physical computer processor and data storage, the computer-implemented method comprising:
   obtaining a geobody index, wherein the geobody index identifies multiple geobodies as a function of position in a subsurface volume of interest;
   obtaining facies probability vectors for the multiple geobodies;
   assigning facies to the multiple geobodies based on the facies probability vectors;
   obtaining target facies proportions for the subsurface volume of interest, wherein a given target facies proportion specifies a ratio for one of the facies in the subsurface volume of interest compared to the other target facies proportions in the subsurface volume of interest;
   based on a first facies proportion of a first facies in the subsurface volume of interest being outside a threshold range of a first target facies proportion for the first facies, reassigning a first geobody with a second facies; and
   reassigning remaining ones of the multiple geobodies with different facies based on corresponding ones of the facies proportions of other facies being outside threshold ranges of corresponding target facies proportions until the corresponding ones of the facies proportions of the other facies in the subsurface volume of interest match the target facies proportions within the threshold ranges.

2. The computer-implemented method of claim 1, further comprising modeling one or more large geobodies in the subsurface volume of interest using a geobody model, wherein the large geobodies are bigger than a geobody threshold.

3. The computer-implemented method of claim 1, wherein the computer system further includes a display, and the computer-implemented method further comprises:
   generating a representation of a facies realization in the subsurface volume of interest using visual effects to depict at least one of the multiple geobodies or at least one of the one or more large geobodies and corresponding facies; and
   displaying the representation.

4. The computer-implemented method of claim 1, wherein the first proportion of the first facies is assigned first because it is a proportion that is furthest from a corresponding threshold range.

5. The computer-implemented method of claim 1, wherein the geobody index is generated based on subsurface data from the subsurface volume of interest.

6. The computer-implemented method of claim 1, wherein the facies probability vector is generated by:
   obtaining facies probability volumes as a function of position in the subsurface volume of interest; and
   generating facies probability vectors for the multiple geobodies based on averages of facies probability volumes corresponding to the multiple geobodies.

7. A computer-implemented method implemented in a computer system that includes a physical computer processor and data storage, the computer-implemented method comprising:
   obtaining a geobody index as a function of position in a subsurface volume of interest, wherein the geobody index identifies multiple geobodies in the subsurface volume of interest, and wherein a given geobody comprises one or more facies;
   obtaining target facies proportions for the subsurface volume of interest, wherein a given target facies proportion specifies a ratio for one of the facies in the subsurface volume of interest compared to the other target facies proportions in the subsurface volume of interest;
   obtaining facies probability vectors for the multiple geobodies; and
   ordering the multiple geobodies into a facies order based on the target facies proportions and the facies probability vectors;
   assigning at least some of the multiple geobodies to the first facies based on the facies order until the first facies is within a facies threshold range of a first target facies proportion; and
   assigning remaining ones of the multiple geobodies to remaining facies until corresponding ones of facies proportions are met within the facies threshold range of the target facies proportions.

8. The computer-implemented method of claim 7, further comprising modeling one or more large geobodies in the subsurface volume of interest using a geobody model, wherein the large geobodies are bigger than a geobody threshold.

9. The computer-implemented method of claim 8, wherein the computer system further includes a display, and the computer-implemented method further comprises:
   generating a representation of a facies realization in the subsurface volume of interest using visual effects to depict at least one of the multiple geobodies or at least one of the one or more large geobodies and corresponding facies; and
   displaying the representation.

10. The computer-implemented method of claim 7, wherein the facies order orders the one or more facies to be assigned to the multiple geobodies from a smallest facies proportion of the target facies proportion to a largest facies proportion of the target facies proportion.

11. The computer-implemented method of claim 7, wherein the geobody index is generated based on subsurface data from the subsurface volume of interest.

12. The computer-implemented method of claim 7, wherein the facies probability vector is generated by:
   obtaining facies probability volumes as a function of position in the subsurface volume of interest; and
   generating facies probability vectors for the multiple geobodies based on averages of realizations of facies probability volumes, wherein a given facies probability vector corresponds to a given geobody.

13. A system configured for generating facies realizations as a function of position in a subsurface volume of interest, the system comprising:
   data storage; and
   a physical computer processor configured by machine-readable instructions to:
   obtain a geobody index as a function of position in a subsurface volume of interest, wherein the geobody index identifies multiple geobodies, and wherein a given geobody comprises one or more facies;
   obtain target facies proportions for the subsurface volume of interest, wherein a given target facies proportion identifies a ratio for one of the facies in the subsurface volume of interest compared to the other target facies proportions in the subsurface volume of interest; and generate facies probability vectors for the multiple geobodies; and assign facies to the multiple geobodies based on the facies probability vectors;

based on a first facies proportion of a first facies in the subsurface volume of interest being outside a threshold range of a first target facies proportion for the first facies, reassign a first geobody with a second facies; and reassign remaining ones of the multiple geobodies with different facies based on corresponding ones of the facies proportions of other facies being outside threshold ranges of corresponding target facies proportions probability vectors until the corresponding ones of the facies proportions of the multiple other facies in the subsurface volume of interest match the target facies proportion within the threshold ranges.

14. The system of claim 13, wherein the physical computer processor is further configured by the machine-readable instructions to model one or more large geobodies in the subsurface volume of interest using a geobody model, wherein the large geobodies are bigger than a geobody threshold.

15. The system of claim 14, wherein the computer system further includes a display and the physical computer processor is further configured by the machine-readable instructions to:

generate a representation of a facies realization in the subsurface volume of interest using visual effects to depict at least one of the multiple geobodies or at least one of the one or more large geobodies and corresponding facies; and display the representation.

16. The system of claim 13, wherein the physical computer processor is further configured by the machine-readable instructions to:

order the multiple geobodies into a facies order based on a probability of individual geobodies including the first facies, wherein the first geobody is most likely to have the first facies;

assign at least some of the multiple geobodies to the first facies based on the facies order until the first facies for the subsurface volume of interest is within a facies threshold range of the facies target proportion; and assign remaining ones of the multiple geobodies to remaining facies until the target facies proportions is met within the facies threshold range.

17. The system of claim 16, wherein the physical computer processor is further configured by the machine-readable instructions to model one or more large geobodies in the subsurface volume of interest using a geobody model, wherein the large geobodies are bigger than a geobody threshold.

18. The system of claim 17, wherein the computer system further includes a display and the physical computer processor is further configured by the machine-readable instructions to:

generate a representation of a facies realization in the subsurface volume of interest using visual effects to depict at least one of the multiple geobodies or at least one of the one or more large geobodies and corresponding facies; and display the representation.

19. The system of claim 16, wherein the facies order orders the one or more facies to be assigned to the multiple geobodies from a smallest facies proportion of the target facies proportion to a largest facies proportion of the target facies proportion.

* * * * *